Jan. 3, 1928.

A. H. MITTAG 1,654,987

REGULATOR

Filed Oct. 28, 1925    4 Sheets-Sheet 1

Inventor:
Albert H. Mittag,
by
His Attorney.

Jan. 3, 1928. 1,654,987

A. H. MITTAG

REGULATOR

Filed Oct. 28, 1925     4 Sheets-Sheet 2

Inventor:
Albert H. Mittag;
by
His Attorney.

Jan. 3, 1928.  1,654,987

A. H. MITTAG

REGULATOR

Filed Oct. 28, 1925   4 Sheets-Sheet 3

Inventor:
Albert H. Mittag,
by
His Attorney.

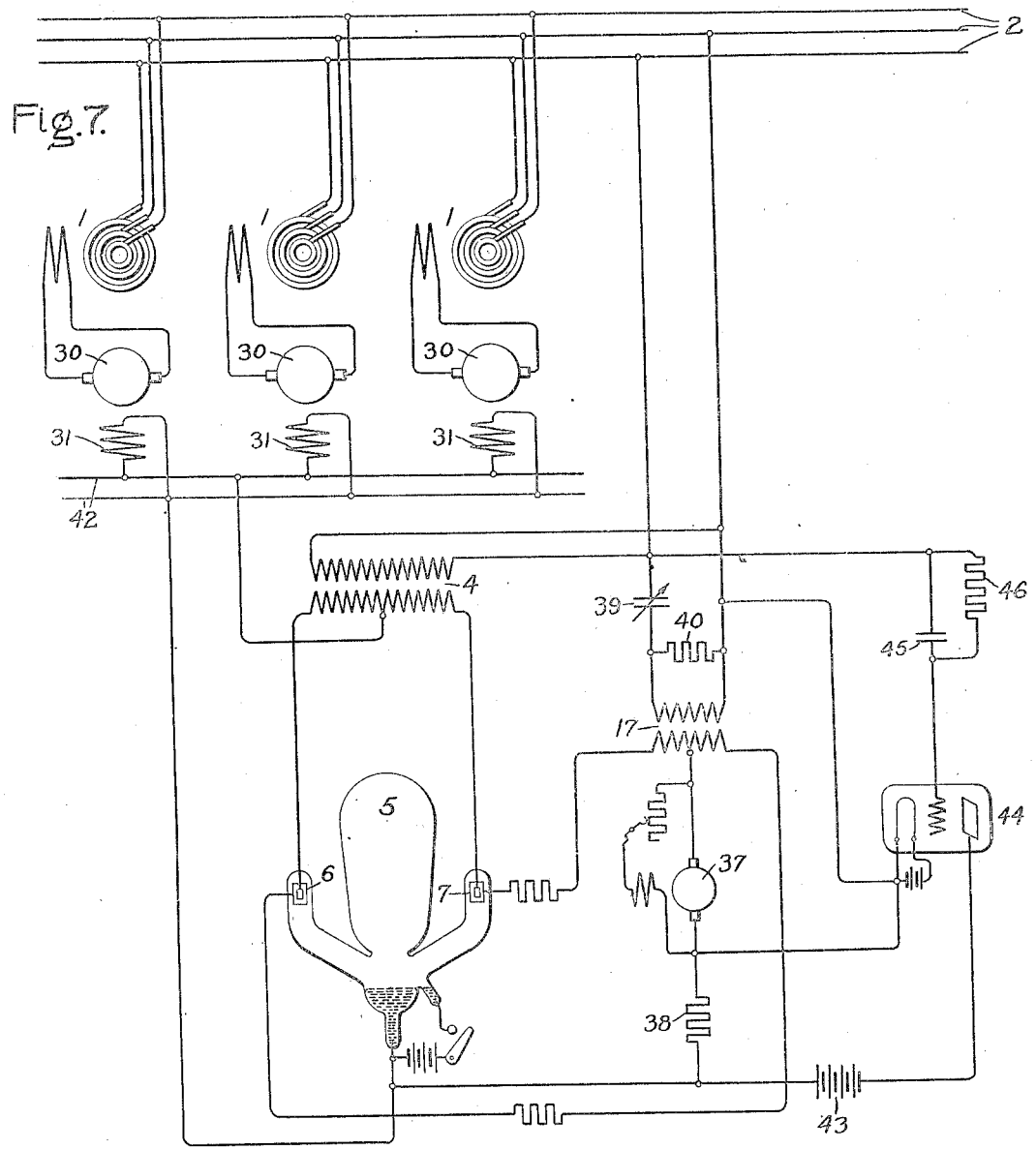

Patented Jan. 3, 1928.

1,654,987

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

REGULATOR.

Application filed October 28, 1925. Serial No. 65,454.

My invention relates to devices for regulating the operation of electrical machines or circuits, and has for its principal object the provision of an improved regulator that does not involve the use of moving contacts and is both sensitive and reliable in its operation.

Various devices have been proposed and used in the past for regulating the voltage or other electrical condition of a machine or circuit. Many of these devices involve the use of moving contacts and are incapable of producing the fine degree of regulation required for stable operation of a machine or circuit under adverse conditions, such as those encountered in connection with high voltage power systems for example. In accordance with my invention, these difficulties are avoided or minimized by regulating means comprising an electric valve which operates without appreciable time delay to prevent substantial variation in the voltage or other electrical condition to be controlled.

My invention will be better understood from the following description when considered in connection with the accompanying drawings and its scope will be pointed out in the appended claims.

Figure 1:
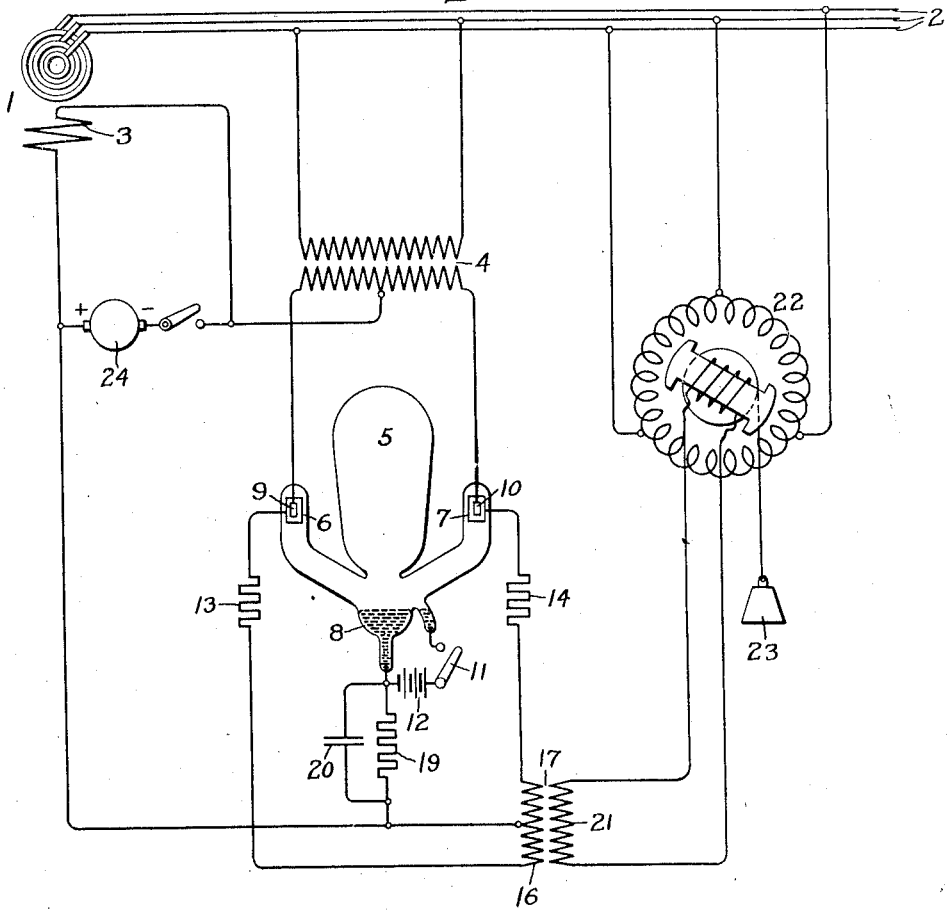
Figure 2:
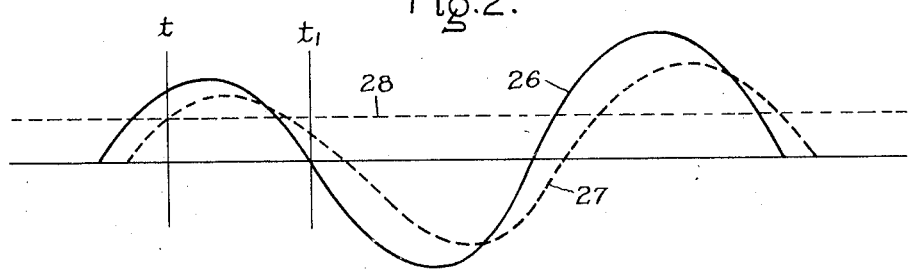
Figure 3:
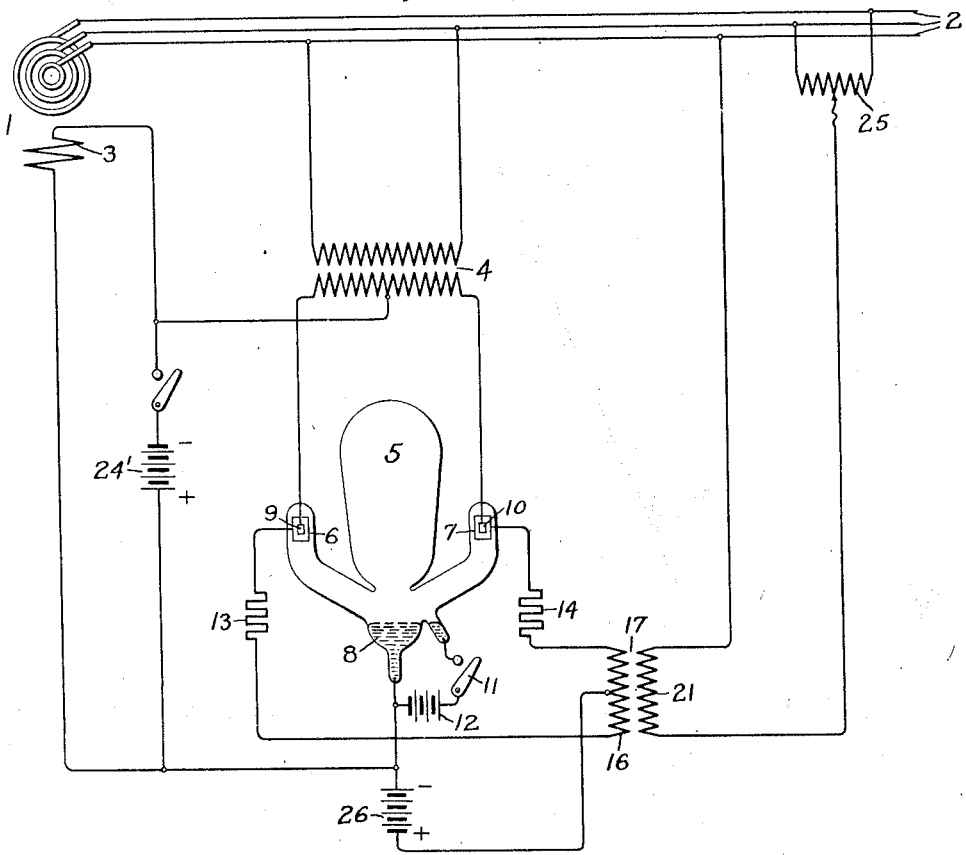
Figure 4:
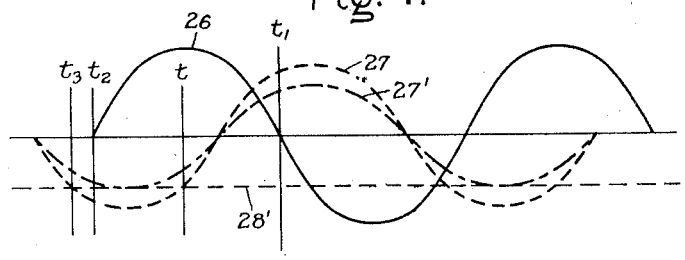
Figure 5:
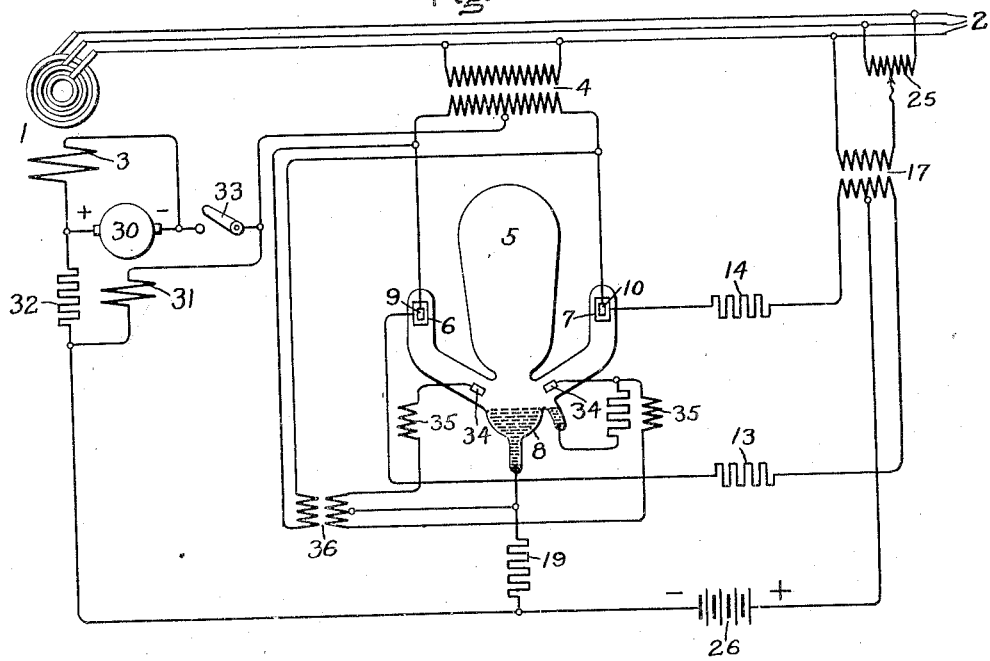
Figure 6:
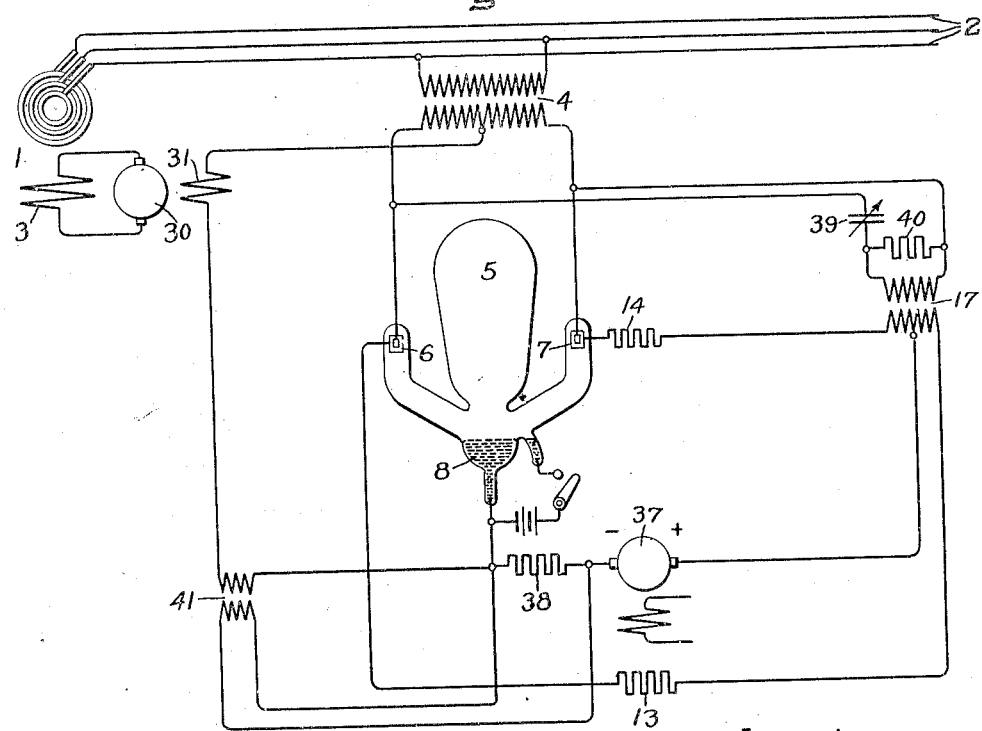

Referring to the drawings, Fig. 1 shows a regulating arrangement wherein my invention has been embodied; Fig. 2 illustrates certain details in the operation of this arrangement; Fig. 3 shows a modified embodiment of the invention; Fig. 4 illustrates certain details in the operation of the arrangement illustrated by Fig. 3; and Figs. 5, 6 and 7 illustrate further modifications of the invention wherein the regulating means is utilized to control the operation of an exciting machine connected to a generator field circuit.

Fig. 1 shows an electrical machine 1 which is connected to a load circuit 2 and is provided with a field winding 3 connected to this circuit through a transformer 4 and an electric valve 5 comprising grids or control electrodes 6 and 7, a mercury cathode 8, anodes 9 and 10, and a starting battery and switch 11 and 12. It should be noted that the starting of current through the device 5 may be prevented by applying a negative potential to the grids but that a negative potential applied to the grids after current has started is incapable of closing the valve until the end of the half cycle when the anode potential passes through its zero value.

The grids 6 and 7 are connected to the cathode 8 through resistors 13 and 14, opposite halves of the secondary circuit 16 of a transformer 17, and a bias resistor 19. A condenser 20 is connected in shunt to the resistor 19 for smoothing out pulsations in the current transmitted through the resistor. The primary circuit 21 of the transformer 17 is connected to the load circuit 2 through a phase control device 22 comprising a polyphase stator winding and a single phase rotor winding. The torque exerted on the rotor shaft of the phase control device through these windings is proportional in value to the square of the load circuit voltage and is opposed by a counterweight 23 provided for regulating the phase relation between the anode and grid potentials of valve 5 in response to variation in the load circuit voltage.

The operation of the invention will be readily understood from a consideration of Fig. 2. In this figure, the anode and grid potentials of valve 5 are represented by the curves 26 and 27 respectively and the negative bias produced through resistor 19 is indicated by a line 28. As previously indicated, the phase relation between the grid and anode potentials of the valve 5 is determined by the position of the phase shifter rotor. This phase relation may be assumed to be as illustrated when the load circuit 2 is operating at normal voltage. Under these conditions, the opposed torques exerted on the rotor shaft are equal, the valve 5 opens at the instant $t$ when the grid potential becomes positive and closes at $t_1$ when the anode potential passes through its zero value, and sufficient current is transmitted through the valve 5 to produce normal excitation of the field winding 3.

If the voltage of the load circuit increases, however, the torque exerted through the phase shifter windings is increased, the phase difference between the grid and anode potentials is increased, the valve 5 opens at an instant of time subsequent to $t$, less current is supplied to the winding 3 and the voltage of the load circuit tends to assume its normal value. If the voltage decreases below its normal value, the torque exerted through the phase shifter windings decreases, the phase difference between the anode and grid potentials is decreased, the valve 5 opens at an instant of time prior to $t$, more current is supplied to the winding 3 and the load circuit voltage tends to assume its normal value. Any slight variation of the load circuit voltage from its normal value thus instantly brings into operation a force tending to restore it to its normal value.

Hunting due to fluctuation in the load circuit voltage is prevented by the bias resistor 19. The potential drop across the resistor 19 under normal operating conditions of the line 2 may be assumed to be as represented by the line 28 of Fig. 2. Upon an increase in the current supplied to the field winding 3, however, this potential drop is increased, the valve 5 opens at an instant of time subsequent to the time $t$, and undue increase in the field current due to overtravel of the phase shifter is prevented. Likewise when the field current decreases, the potential drop of resistor 19 decreases, the valve 5 opens at an instant of time prior to the time $t$ and further decrease in the field current is prevented. Fluctuations in field current and load circuit voltage are thus prevented from building up to injuriously high values.

An auxiliary machine 24 may be provided for exciting the winding 3 to build up the voltage of the machine 1. This machine will of course be unnecessary in cases where the machine 1 possesses sufficient residual magnetism to insure its proper starting.

Fig. 3 shows an embodiment of the invention which differs from that of Fig. 1 in that the phase shifter is replaced by a phase adjusting device 25, the negative bias resistor 19 and the smoothing condenser 20 are replaced by a battery 26 for producing a positive bias on the grids of the valve 5, and the auxiliary starting exciter 24 is replaced by a battery 24'.

The operation of the embodiment illustrated by Fig. 3 will be explained by reference to Fig. 4 wherein the curve 26 represents the anode potential, the curves 27 and 27' represent different values of grid potential, and the positive bias of battery 26 is represented by a line 28'. The phase relation between the anode and grid potentials when the load circuit 2 is operating at normal voltage may be assumed to be that indicated by curves 26 and 27. Under these conditions, the valve 5 opens at the instant $t$ when the grid potential becomes positive and closes at the instant $t_1$ when the anode potential passes through its zero value, and the excitation of winding 3 is maintained at its normal value. If the voltage of the load circuit increases, the grid potential is increased, the valve 5 opens at an instant of time subsequent to the time $t$, the current of winding 3 is reduced and the load circuit voltage tends to decrease to its normal value. If the grid potential decreases to the value represented by the curve 27' the grid is still positive at the instant $t_2$ when the anode becomes positive and current is transmitted through the valve during the complete half cycle, thus increasing the field excitation and restoring the load circuit voltage to its normal value without substantial delay between the beginning and correction of the variation from normal voltage.

Fig. 5 shows an exciter 30 for supplying the excitation of the field winding 3. This exciter is provided with a field winding 31 which is connected to the valve 5 and is arranged to be connected to the exciter terminals through resistor 32 and a switch 33 during starting of the machine 1. The resistor 19 and battery 26 are both utilized to control the grid bias of the grids. In the operation of this arrangement, the movable contact of the device 25 is adjusted to produce the proper phase relation between the grid and anode potentials, and the variation in grid bias produced by the resistor 19 and battery 26 is utilized to regulate opening of the valve 5 in a manner to give the load circuit voltage a drooping characteristic.

In Fig. 5 the valve 5 has been shown as provided with exciting electrodes 34 which are connected to the transformer 4 through reactors 35 and a transformer 36 for ensuring an incandescent spot at the cathode. It will be apparent that such exciting electrodes may be utilized in connection with the valves shown in the various figures of the drawing.

In the arrangement of Fig. 6, the grids 6 and 7 are connected to the cathode 8 through resistors 13 and 14, the secondary circuit of the transformer 17, a positive bias device 37 and an anti-hunting resistor 38. The primary circuit of the transformer 17 is connected to the transformer 4 through phase control means shown as an adjustable condenser 39 and a resistor 40. The exciter field winding 31 is connected to the valve 5 through a transformer 41, the secondary winding of which is connected to the resistor 38. With these connections, hunting is prevented due to variations in the grid bias, this variation being produced by a counter electromotive force applied to the resistor 38 through the transformer 41 when the exciter field current is changing in value. The proper phase relation between the grid and anode voltage is produced by adjustment of the condenser 39.

Fig. 7 shows an exciter bus 42 to which current is supplied through the valve 5 and the transformer 4. An anti-hunting device comprising current supply means 43, a valve 44, and a grid leak condenser 45 and resistor 46 is provided for applying to the resistor 38 a counter electromotive force which varies in accordance with the load circuit voltage. This variation is due to the fact that the grid potential of the valve 44 is equal or proportional to the load circuit voltage. Other means for varying the grid bias in a manner to prevent hunting will readily occur to those skilled in the art.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. The combination of an electrical valve comprising a grid for controlling the transmission of current between its cathode and anode, means for controlling the phase relation between the potentials of said grid and anode, and means for applying to said grid a bias potential controlled by the anode current of said valve.

2. The combination of an electrical valve comprising a grid for controlling the transmission of current between its cathode and anode, means for applying alternating potentials to said grid and anode, means connected between said cathode and grid for applying a bias potential to said grid, and means for regulating the phase relation between the potentials of said grid and anode.

3. The combination of an electrical valve comprising a grid for controlling the transmission of current between its cathode and anode, means for applying alternating potentials to said grid and anode, and means connected between said cathode and grid for applying a positive bias potential to said grid and controlling the phase relation between the potentials of said grid and anode.

4. The method of regulating an electrical condition of a circuit interconnected with a valve comprising a grid for controlling the transmission of current between its cathode and anode, which comprises varying the phase relation between the potentials of said grid and anode, and applying to said grid a negative bias potential which is varied in accordance with change in said condition.

5. The method of regulating an electrical condition of a circuit interconnected with a valve comprising a grid interposed between a cathode and anode, which comprises adjusting the phase relation between the potentials of said grid and anode, and applying to said grid a counter-electromotive force which is varied in accordance with change in said condition.

6. The combination of a machine comprising a load circuit and a field circuit, means interconnecting said circuits comprising an electric valve provided with a grid interposed between a cathode and an anode, and a device connected between said cathode and grid for applying to said grid a bias potential responsive to the current transmitted between said circuits.

7. The combination of a machine comprising a load circuit and a field circuit, means interconnecting said circuits comprising an electric valve provided with a grid interposed between a cathode and an anode, and means for biasing said grid to a positive potential and means connected between said cathode and grid for opposing said bias potential by a counter-electromotive force responsive to the current transmitted between said circuits.

8. The combination of a machine comprising load and field circuits, an electric valve provided with a cathode and an anode connected between said circuits and with a grid arranged to control the current transmitted through said cathode and anode, and means for adjusting the phase relation between the potentials of said grid and anode to control the current transmitted between said circuits.

9. The combination of a machine comprising load and field circuits, an electric valve provided with a cathode and an anode connected between said circuits and with a grid arranged to control the current transmitted through said cathode and anode, means for adjusting the phase relation between the potentials of said grid and anode to control the current transmitted between said circuits, and anti-hunting means for applying between said cathode and grid an electromotive force responsive to current transmitted between said circuits.

10. The combination of a machine comprising load and field circuits, an electric valve provided with a cathode and an anode connected between said circuits and with a grid arranged to control the current transmitted through said cathode and anode, and means for applying to said grid a bias potential which varies in accordance with the relation between the electrical conditions of said circuits.

In witness whereof, I have hereunto set my hand this 27th day of October, 1925.

ALBERT H. MITTAG.